UNITED STATES PATENT OFFICE.

JACK CHURCHWARD, OF NEW YORK, N. Y., ASSIGNOR TO WILSON WELDER & METALS COMPANY, INC., A CORPORATION OF NEW YORK.

ELECTRICAL ARC WELDING.

1,423,914. Specification of Letters Patent. Patented July 25, 1922.

No Drawing. Application filed January 14, 1920, Serial No. 351,358. Renewed February 3, 1922. Serial No. 533,981.

*To all whom it may concern:*

Be it known that I, JACK CHURCHWARD, a citizen of the United States, and a resident of the city, county, and State of New York, have invented certain new and useful Improvements in Electrical Arc Welding, of which the following is a specification.

My invention relates to an improved method of electric arc welding, and one object is to improve the character and increase the purity of the weld deposit.

Another object of my invention is to produce a method of electric arc welding in which the welding metal will be deposited more rapidly, efficiently and cheaply.

Hitherto electric arc welding has been practiced according to two general methods. In the first of these general methods, the metal to be deposited upon the work was supplied by the electrode which also furnished the heat to the arc. This method, which has been called the "metallic-arc" method, when properly carried out produced a very high grade of weld deposit. Unfortunately, however, it was necessary to use an electrode of quite small cross-section because the higher amperage, which would be necessary to fuse a large electrode, would be detrimental to the weld. It will be evident, therefore, that with the "metallic-arc" method the metal necessarily was deposited comparatively slowly and, consequently, this method was limited in its application to weld operations not necessitating rapid metallic deposit.

The second of the two general methods above mentioned was the so-called "carbon-arc" method. In this method a carbon electrode was employed for supplying the necessary heat to the arc while the welding metal itself was fed to the arc by means of a metal rod. The metal rod could be made of any convenient shape and the size of the rod was dependent only on the speed of metallic deposit, which could be made as rapid as desired. In practicing the "carbon-arc" method it was found that a certain amount of carbon from the electrode entered the composition of the metallic weld deposit. This contamination with carbon was in many instances deleterious to the properties of the weld and was particularly deleterious when welding low carbon steel for, as is well known, the addition of carbon to such steel has a tendency to render it brittle and porous.

My invention aims to combine the advantages of the two general methods above mentioned without any of the disadvantages. I have discovered that the above objects and aims may be secured by employing a tungsten electrode to supply the heat to the arc and furnishing the metal either by a metallic rod or from the work itself.

One of the advantages of operating with a tungsten electrode is that contamination of the weld by carbon is entirely obviated. Tungsten, as is well known, has an exceedingly high melting point (3200° C.) and, consequently, in the heat of the arc the tungsten electrode does not melt but merely oxidizes slowly, forming an oxide of tungsten. This oxide does not interfere with the welding and it has been found that it does not in any way injure the weld deposit.

One example of the many uses to which my invention may be put is in the filling up of blow-holes in low carbon steel castings. This operation often requires a large mass of metal to be deposited, particularly where the castings are of large size. The "metallic-arc" method has been found to be so slow and laborious that in many instances it is extremely expensive to employ it for this work and, hence, that method is practically unavailable. The "carbon-arc" method is also unavailable owing to the contamination of the weld by the carbon from the electrode. By my new method of "tungsten electrode welding," however, the blow-holes of the castings may be speedily and efficiently filled up with metal having all the required physical and chemical characteristics. While tungsten is more expensive than carbon for electrodes, it has been found by experience that for this class of work it is cheaper to use it on account of the more satisfactory results obtained.

Another important use to which my invention may be put is in the rapid welding of thin sheets of low carbon steel, as for example the seams of thin steel tubes. In welding such metal sheets, it has been found that no metal rod is necessary for the reason that the welding metal is entirely supplied by the thin sheets themselves, the heat of the arc being sufficient to fuse the edges of the sheets and weld the same. If a carbon electrode were used for such work, the metal at the joint would become badly contaminated with carbon, causing the same to be brittle and porous. By my new method of welding with a tungsten electrode, however, a durable, strong and ductile joint is obtained.

Another example of the use of my invention is in the cutting of metals by the electric arc where it is desired to positively prevent carbonization of the metal by the electrode.

It will be obvious, therefore, that my new method of welding combines the purity of deposit characteristic of the "metallic-arc" method with the rapidity of operation characteristic of the "carbon-arc" method.

I desire it to be understood that my invention is not limited to the specific examples herein disclosed, but may be practiced in various other ways within the scope of the following claims:

Having fully described my invention, what I claim as new and desire to secure by Letters Patent is:

1. An electrode for electric arc welding composed of tungsten.

2. An electrode for welding steel by the electric arc method composed essentially of tungsten.

3. An electrode for electric arc welding for supplying heat only to the arc, said electrode being composed of a metal which will not carbonize the metal passing through the arc.

4. An electrode for welding steel by the electric arc method consisting of an inert metal, which will neither melt nor gasify at the temperature of the arc.

5. A method of improving the character of the metallic deposit produced by the electric arc method, which comprises supplying heat to the arc from an electrode of tungsten and supplying welding metal to the arc.

6. A method of improving the character of the metallic deposit produced by the electric arc method, which comprises supplying heat to the arc from an electrode of tungsten and supplying welding metal to the arc from a metal rod.

7. A method of improving the character of welds produced by the electric arc method, which comprises supplying heat to the arc from an electrode of an inert metal and supplying welding metal to the arc.

8. A method of improving the character of welds produced by the electric arc method, which comprises supplying heat to the arc from an electrode of inert metal free from carbon and supplying welding metal to the arc.

9. A method of carrying out an electric welding operation to prevent the introduction of carbon into the weld, which comprises supplying the heat to the arc from an electrode of inert refractory metal which will not produce carbon dioxide at the temperature of the arc.

In testimony whereof, I have affixed my signature to this specification.

JACK CHURCHWARD.